Figure 1:
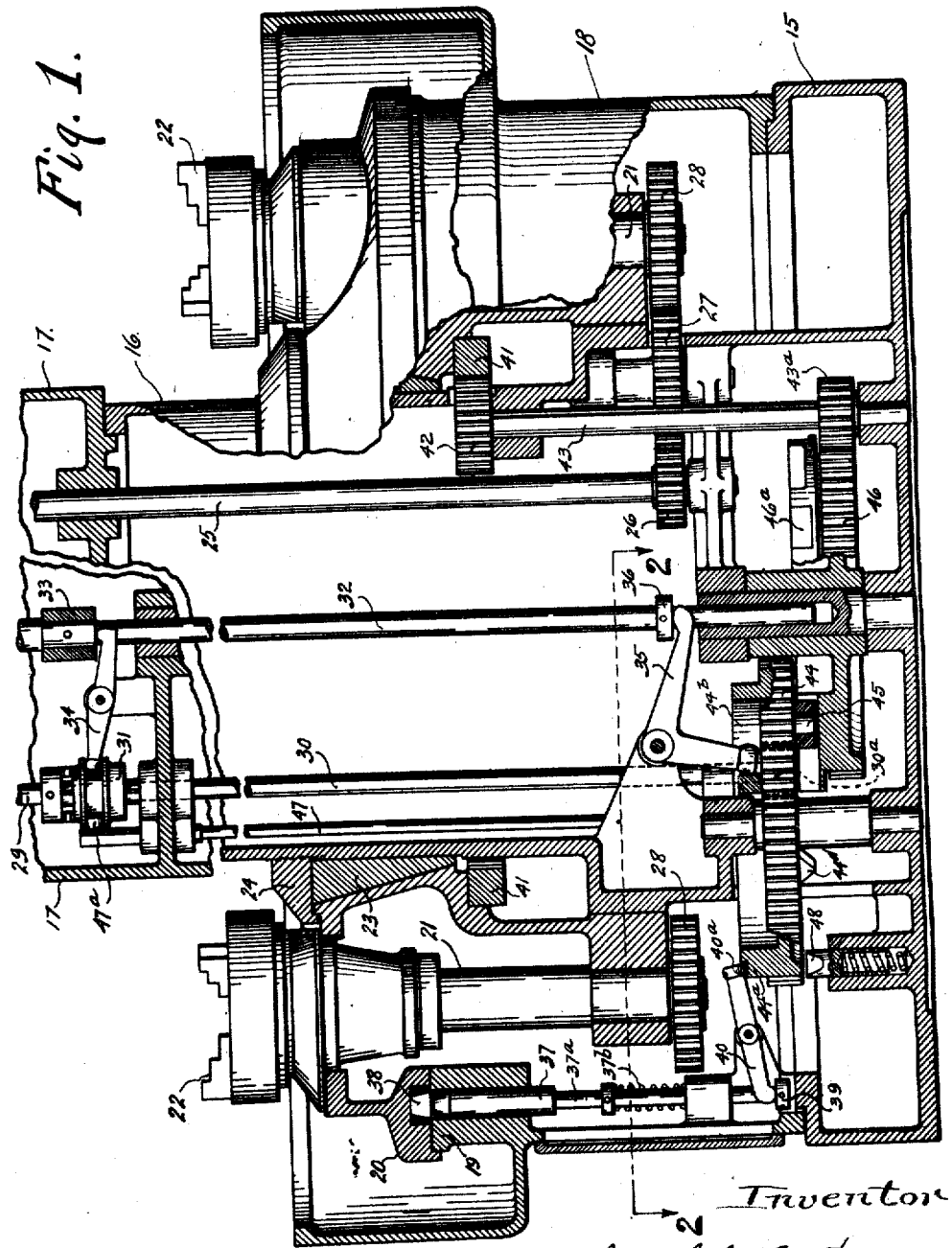

June 10, 1924.

J. J. N. VAN HAMERSVELD 1,496,795

INDEXING MECHANISM FOR MACHINE TOOLS

Filed May 17, 1922   7 Sheets-Sheet 1

Inventor
John J. N. Van Hamersveld
by Thurston ...
Attys

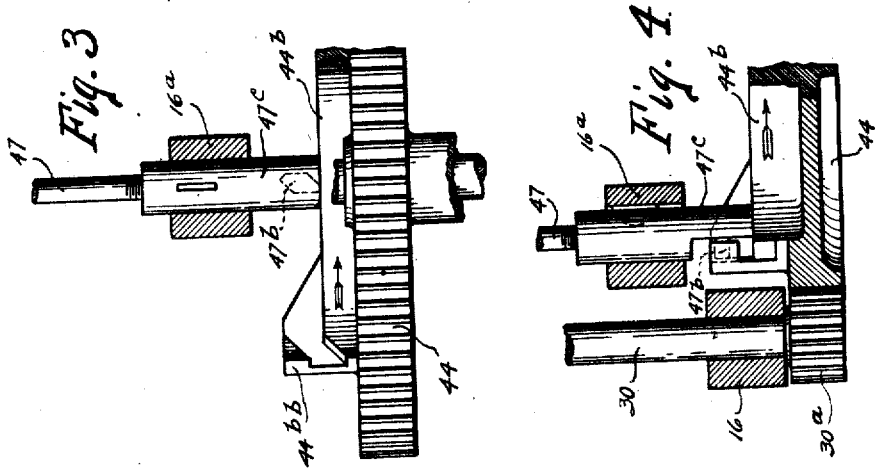
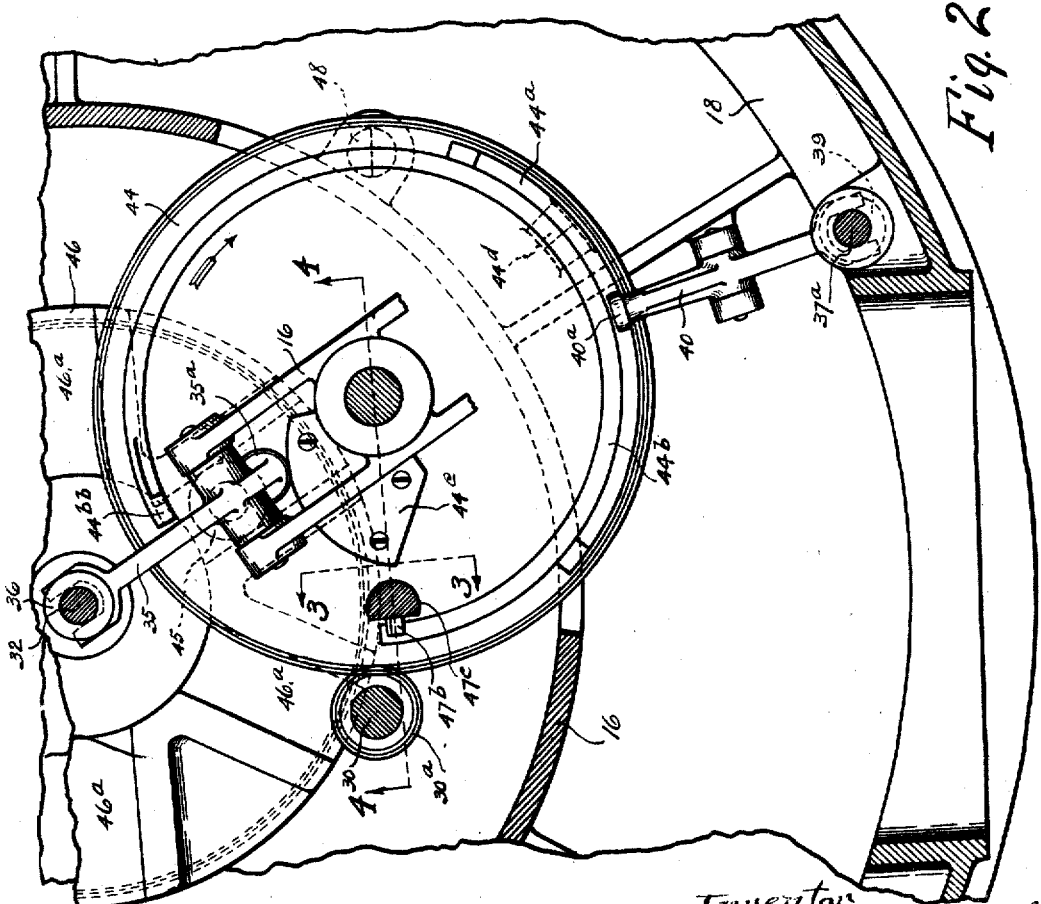

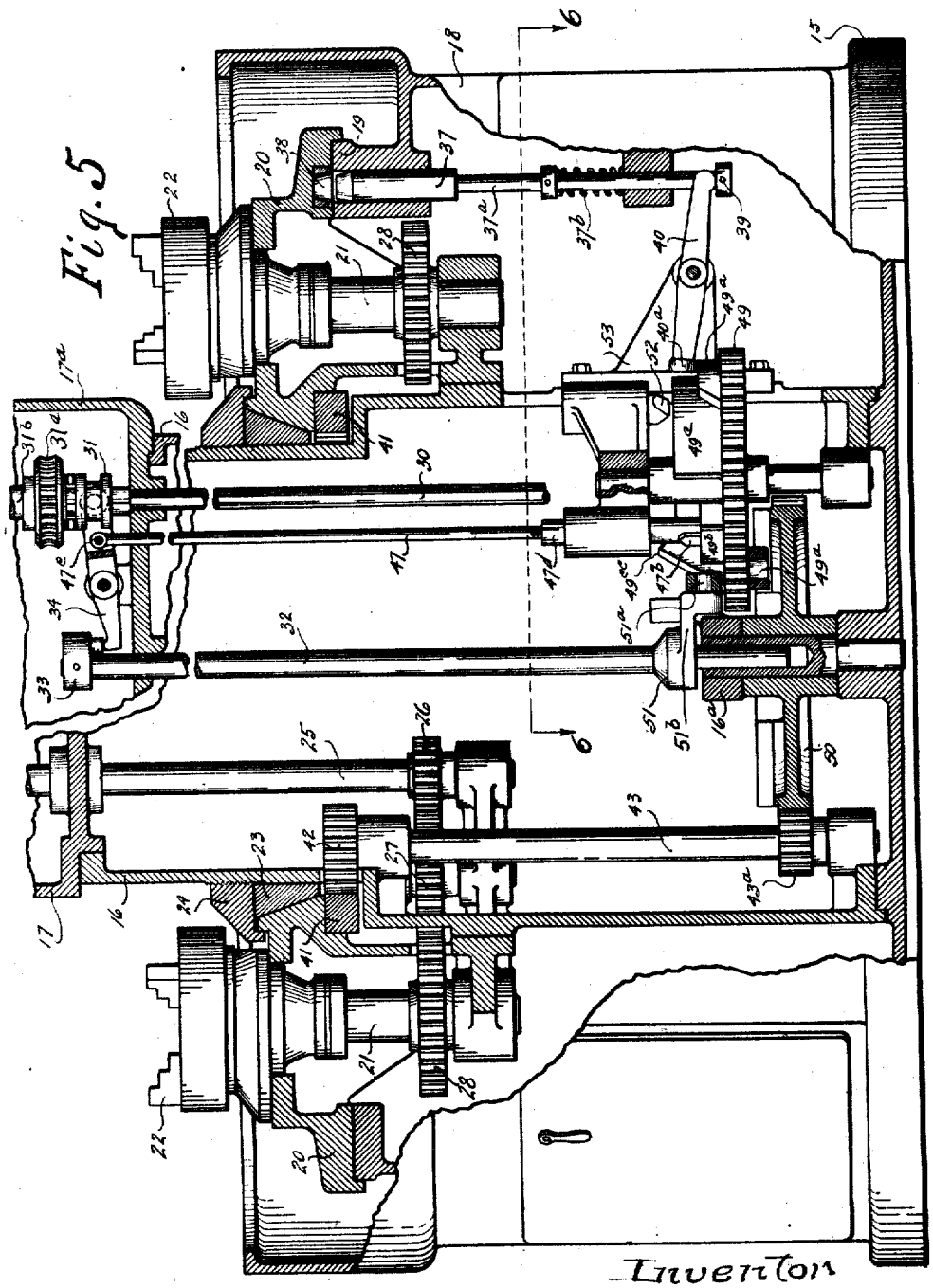

June 10, 1924.
J. J. N. VAN HAMERSVELD
1,496,795
INDEXING MECHANISM FOR MACHINE TOOLS
Filed May 17, 1922 7 Sheets-Sheet 4
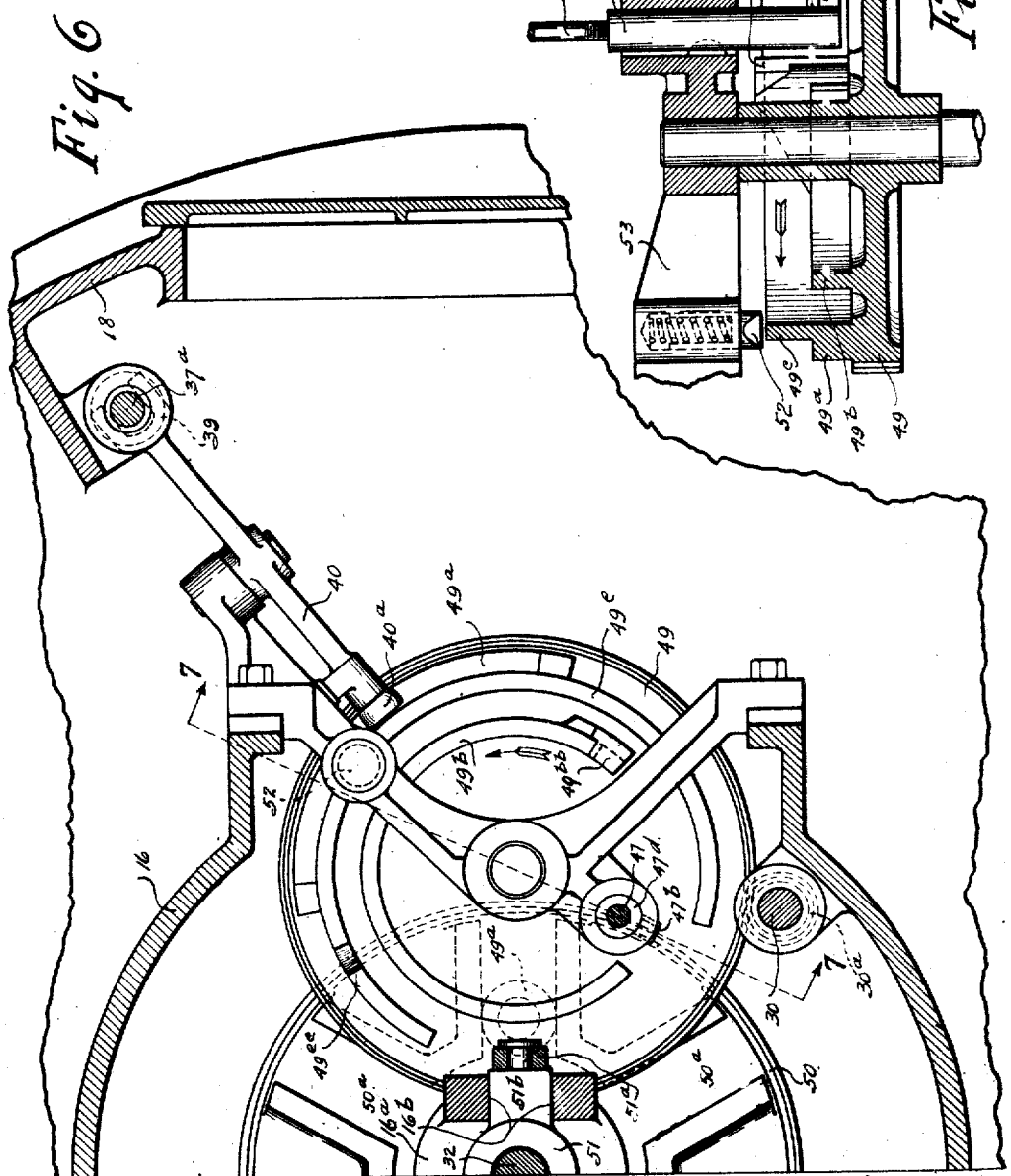

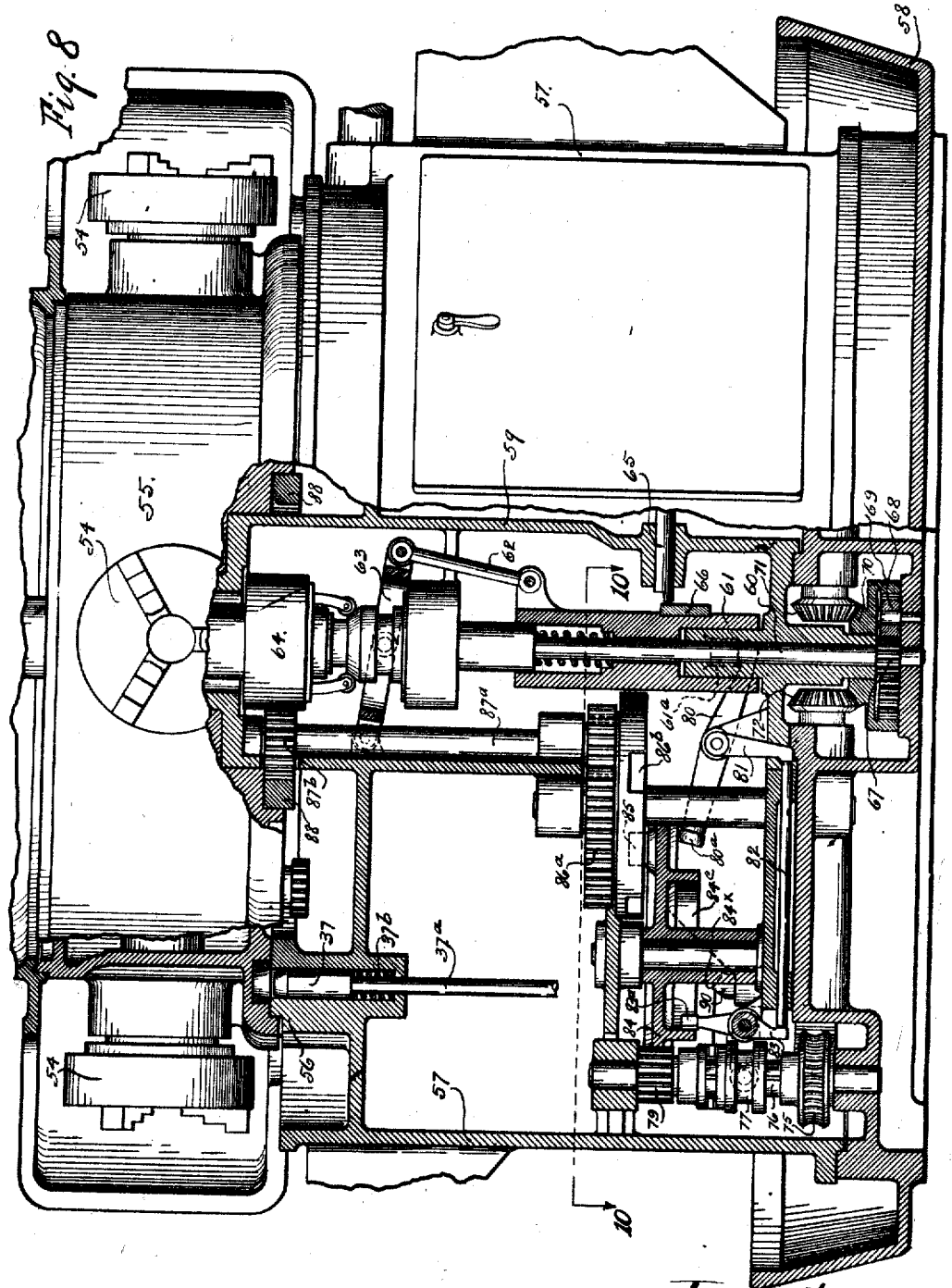

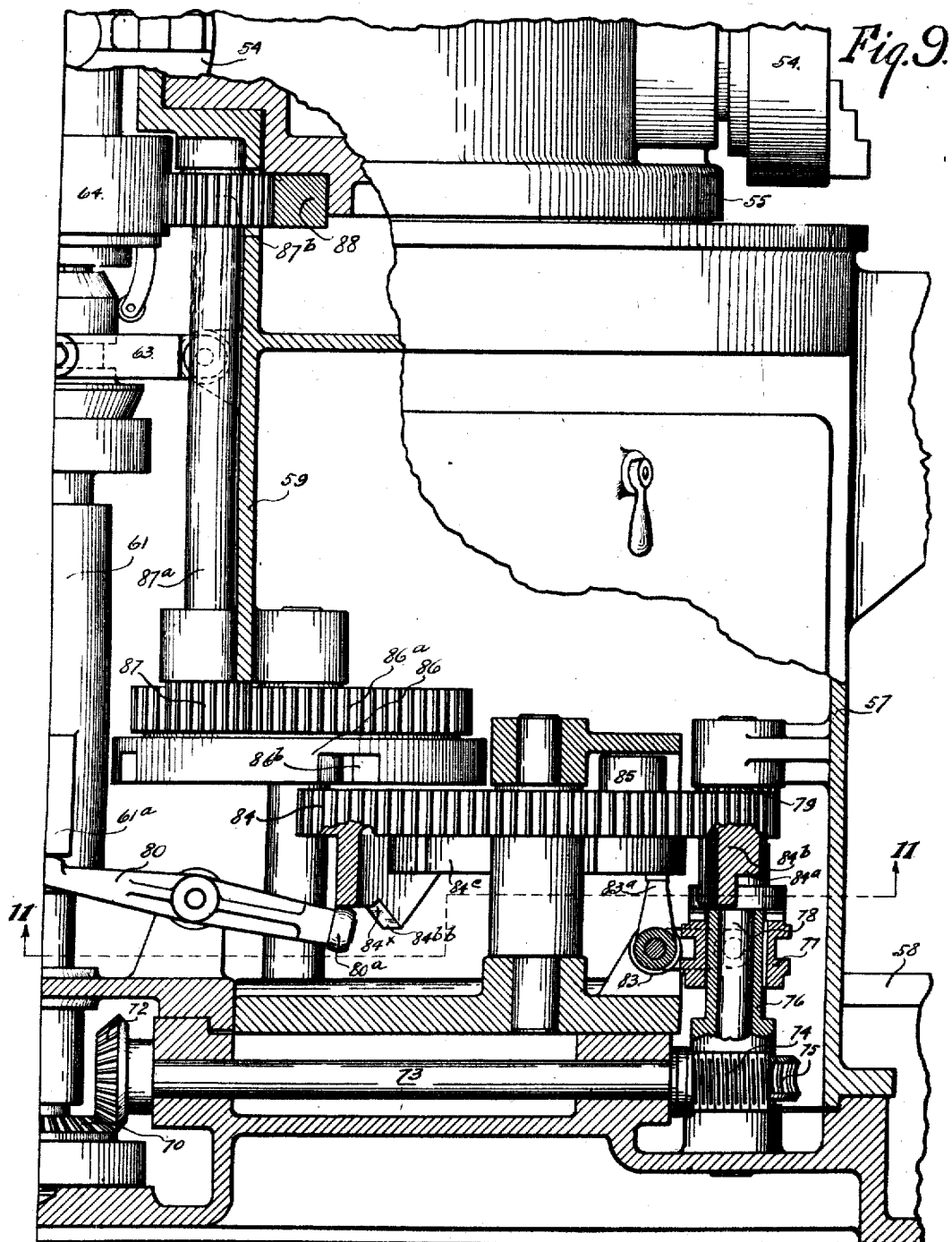

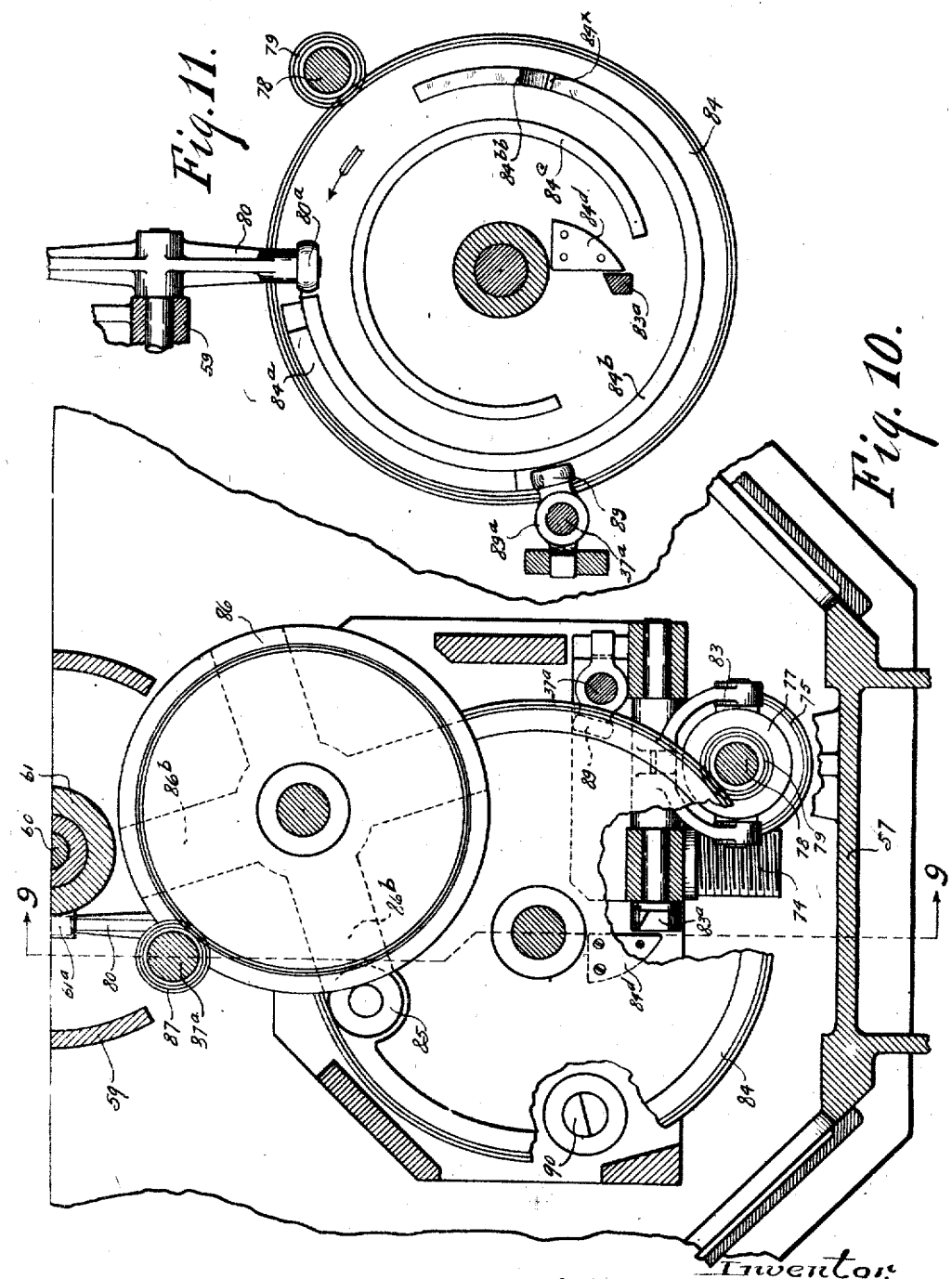

Patented June 10, 1924.

1,496,795

UNITED STATES PATENT OFFICE.

JOHN J. N. VAN HAMERSVELD, OF CLEVELAND, OHIO, ASSIGNOR TO THE WARNER AND SWASEY COMPANY, OF CLEVELAND, OHIO, A CORPORATION OF OHIO.

INDEXING MECHANISM FOR MACHINE TOOLS.

Application filed May 17, 1922. Serial No. 561,692.

*To all whom it may concern:*

Be it known that I, JOHN J. N. VAN HAMERSVELD, a citizen of the United States, residing at Cleveland, in the county of Cuyahoga and State of Ohio, have invented a certain new and useful Improvement in Indexing Mechanism for Machine Tools, of which the following is a full, clear, and exact description.

This invention relates to an indexing mechanism for machine tools, and particularly for automatic multiple spindle chucking machines. In fact, the indexing mechanisms disclosed in this application constitute parts of automatic multple spindle chucking machines forming the subject matter of three prior applications of which the present application is a composite division, said prior applications being Serial No. 424,139, filed November 15, 1920; Serial No. 437,436, filed January 15, 1921; and Serial No. 534,887, filed February 8, 1922.

In said prior applications I have disclosed automatic multiple spindle chucking machines having a series of work stations and a loading station, and provided with a rotary spindle carrier carrying a number of work spindles and having also at the different work stations, tool heads, particularly tool slides adapted to be provided with cutting tools to simultaneously perform a series of cutting operations on the work pieces held in the chucks of the different work spindles.

In said machines provision is made for simultaneously rotating the work spindles, also for imparting at different times relatively fast and relatively slow movements to the tool heads.

Additionally each machine is provided with an indexing mechanism, the primary function of which is to impart step by step indexing movements to the spindle carrier. Additionally the indexing mechanism in each instance performs other functions more or less closely allied to the indexing function, and these include the release or unlocking of the spindle carrier just prior to the indexing movement, the restoration to normal position of the part which timed or brought about the action of the indexing mechanism, and finally the locking of the spindle carrier against rotation following the completion of the indexing movement.

In the machines shown in the first and second applications above referred to, the work spindles are arranged vertically on the horizontally disposed spindle carrier and extending up from the base centrally through the machine there is a vertical column on which are mounted for vertical movements the several tool slides, the second machine differing from the first largely in the fact that the feed units for the tool slides are arranged in the base of the machine rather than in the head permitting a somwhat more compact and shorter machine to be produced with the same floor space.

In the third application referred to, a still shorter and more compact machine is obtained by providing the horizontally rotatable spindle carrier with horizontally and radially arranged rotary work spindles, and by arranging the tool slides outside of the spindle carrier and providing in and out horizontal movement therefor.

In the machines of all three applications the timing of the indexing of the spindle carrier is brought about by the downward movement of a vertically movable controller which is automatically released when all the work stations have completed their individual cutting operation and the tool heads have reached their former positions. When the controller moves downward by gravity, or by gravity assisted by a spring if necessary, it releases the spindle carrier by unclamping it from the circular way constituting a part of the frame of the machine and causes the engagement of a clutch which starts the operation of the indexing unit. When the indexing unit is started it first withdraws a lock bolt which is designed to engage in one of several taper bushings carried by the spindle carrier so as to lock it against rotation and definitely position it with respect to the tool heads of the different work stations, after each indexing movement. Next the indexing unit causes the spindle carrier to be turned through a fraction of a revolution depending upon the number of work stations, following which the spindle carrier is again locked in position by the lock bolt and clamped to the circular way.

During the indexing movement of the spindle carrier the indexing unit performs a further function of elevating the controller to its normal position, the elevating of this member serving to engage the clutch which controls the spindle drives and to start the feed units of the different work stations in operation.

When the controller is raised, the feed units of the different work stations start their individual cycles, but before the indexing unit has completed all its functions, a Geneva motion gear forming a part thereof is caused to continue its rotation until it has made one complete rotation, the indexing unit having means for preventing the disengagement of the clutch controlling the indexing unit until the Geneva motion gear has completed its rotation as just stated.

The principal object of the present invention is to provide an efficient indexing mechanism, and particularly an indexing unit especially adapted, but not necessarily confined in so far as all features of the invention are concerned, to automatic multiple spindle chucking machines such as illustrated in my prior applications above referred to.

Further the invention aims to provide an indexing unit which is constructed and arranged not only to cause the spindle carrier to be indexed, but also to perform the additional functions referred to above.

A further object is to provide an indexing mechanism or unit which acts as a safety device to prevent the premature functioning of other parts such as the lowering of the controller prior to the completion of all movements and functions of the indexing mechanism and prevents the disengagement of its driving clutch to guarantee a complete rotation of its Geneva motion member. In order words, it is one of the objects of the invention to provide as a part of the indexing mechanism, means for insuring the maintenance of the various parts of the machine in their proper timed relationship, and the prevention of the operation of one part out of the regular sequence and before the proper completion of the function of some other part.

The invention may be briefly summarized as consisting in certain novel details of construction, and combinations and arrangements of parts which will be described in the specification and set forth in the appended claims.

In the accompanying sheets of drawings wherein I have shown three embodiments of my invention, Fig. 1 is a vertical sectional view of the lower part of an automatic multiple spindle chucking machine shown in my application, Serial No. 424,139, this view illustrating particularly the indexing unit and some of the other parts of the machine; Fig. 2 is a transverse sectional view substantially along the line 2—2 of Fig. 1, looking in the direction indicated by the arrows; Fig. 3 is a detail sectional view substantially along the line 3—3 of Fig. 2, looking in the direction indicated by the arrows; Fig. 4 is a detail sectional view substantially along the line 4—4 of Fig. 2; Fig. 5 is a view similar to Fig. 1, showing a portion of the machine of my application Serial No. 437,436, and illustrating a slight modification of the indexing mechanism; Fig. 6 is a transverse sectional view substantially along the line 6—6 of Fig. 5; Fig. 7 is a detail sectional view substantially along the line 7—7 of Fig. 6; Fig. 8 is a view similar to Figs. 1 and 5, showing a portion of the machine illustrated in my application Serial No. 534,887, and showing a further slight modification of the indexing mechanism; Fig. 9 is a sectional view substantially along the line 9—9 of Fig. 10; Fig. 10 is a transverse sectional view substantially along the line 10—10 of Fig. 8; and Fig. 11 is a detail sectional view substantially along the line 11—11 of Fig. 9, looking upward or in the direction indicated by the arrows.

Referring now to the drawings and first to Figs. 1, 2, 3 and 4, 15 represents the base of the automatic multiple spindle chucking machine, from which base rises a central column 16 having an extension 17 on which the several tool slides, not shown, are adapted to be mounted. A frame 18 which rests upon and is secured to the base 15, has a circular way 19 constituting a support for the rotary spindle carrier 20 having a plurality of vertically disposed rotary work spindles 21 provided at their upper ends with chucks 22 for holding the work pieces, this spindle carrier being centered on the column 16 by a taper ring 23 held in place by a circular nut 24 which is threaded onto a portion of the column 16.

As the present invention resides particularly in the indexing mechanism it is unnecessary to illustrate the entire machine fully shown and described in my application Serial No. 424,139, and only those parts which directly co-operate with the indexing mechanism are shown. It will be sufficient to state, therefore, that power is derived from the main drive shaft for the purpose of rotating the work spindles through the medium of a series of vertical shafts 25, one of which is provided for each work station, and rotary movement is transmitted from these shafts to the work spindles 21 by gear trains, each including a pinion 26 at the bottom of the lower end of the associated shaft 25, an idler gear 27 which is supported on the center column and a gear 28 which is secured to the lower end of one of the work spindles. When the spindle carrier is indexed the several gears 28 move therewith out of engagement with the idler gears 27, and at the completion of the indexing movement these gears 28 roll into mesh with the said idler gears 27. Likewise, it may be stated that the indexing unit is operated by a constant speed shaft 29 which is continuously rotated by the main drive shaft, and by a shaft 30 designed to be clutched to the shaft 29 by a clutch indicated at 31, this clutch being engaged when the indexing unit is to be operated, and being disengaged when the Geneva motion gear of the indexing unit has substantially completed one rotation.

Extending centrally through the column 16 is a controller which in this instance is in the form of a slidable rod 32, the function of this controller so far as the indexing mechanism, and therefore the present invention is concerned, being to start the indexing unit in operation. This controller 32 is provided with a collar 33 which causes the engagement of the clutch 31 when the controller lowers, motion being transmitted from the collar to the clutch by a clutch lever 34. For the purpose of elevating the controller there is provided inside the column and supported thereby, a bell-crank 35 which is operated by the indexing mechanism in the manner hereinafter described, and has an arm extending inwardly toward the controller beneath a lower collar 36 arranged so that when the inwardly extending arm of the bell-crank 35 is elevated, this arm by engaging under the collar 36 will restore the controller to its normal upper position where it is automatically locked and prevented from lowering as fully described in my application Serial No. 424,139.

To lock the spindle carrier in position after each indexing movement the frame 18 is provided with a vertically movable lock bolt 37 having an upper tapered end adapted to engage into one of several bushings 38 carried by the spindle carrier. The lock bolt has a rod 37ª extending downwardly toward the base of the machine and at this lower end it is provided with a collar 39 adapted to be engaged by the outer end of a lever 40 pivotally supported on the frame 18 and having at its inner end a roller 40ª.

For the purpose of rotating the spindle carrier the latter is provided with an internal gear 41 which is engaged by a gear 42 on a vertical shaft 43 supported by the central column and base, and provided near its lower end with a gear 43ª which is driven by an indexing gear to be referred to.

Taking up now the indexing mechanism per se it will be observed that the shaft 30 is provided at its lower end with a pinion 30ª which engages and is adapted to drive a Geneva motion gear 44, this gear being provided in this instance on its lower face with a rolller 45 adapted to engage in one of a series of radial slots of an indexing gear 46, the radial slots being shown in Fig. 2 and designated 46ª. This indexing gear as shown in Fig. 1 engages and drives the gear 43ª mounted on the vertical shaft 43 which imparts rotary motion to the indexing carrier, the ratio between the indexing gear 46 and the gear 43ª being the same as the ratio between the internal gear 41 and the gear 42, so that the indexing gear 46 will move the internal gear 41 and therefore the spindle carrier through the same arc that the indexing gear is moved by the Geneva motion gear.

By reference particularly to Fig 2 it will be observed that there is provided on the upper face of the Geneva motion gear 44 an arc shaped cam 44ª which is arranged near the periphery of the gear, this cam being adapted to engage the roller 40ª of the lever 40 so as to rock said lever and disengage the lock bolt 37 from the bushing of the spindle carrier. Inside of the circular or arc shaped cam 44ª the Geneva motion gear is provided with a similar but long arc shaped cam 44ᵇ. The function of this arc shaped cam is to prevent the clutch 31 being disengaged when the controller 32 is elevated, and that this might be done, I provide inside the vertical central column 16 an endwise movable rod 47 provided at its upper end with a roller 47ª which engages in a groove of the shiftable clutch element of clutch 31. At its lower end this rod 47 (see Figs. 2, 3 and 4) is provided with a lug 47ᵇ and this lug is engaged by the arc shaped cam 44ᵇ and rides on the top of this cam so as to prevent the lowering of the rod 47 and the disengagement of the clutch 31 after the controller 32 has been elevated, and until the Geneva motion gear 44 has substantially completed one rotation, at which time the rod 47 is lowered so as to disengage the clutch by a beveled cam portion designated 44ᵇᵇ, provided at the end of the arc shaped cam 44ᵇ.

Additionally the Geneva motion gear 44 is provided inside the arc shaped cam 44ᵇ with a face cam 44ᶜ, this face cam being adapted to be engaged by a roller 35ª at the bottom of a downwardly extending arm of the bell-crank 35 which is instrumental in raising the controller 32. This face cam 44ᶜ engages the roller 35ª during the indexing movement of the carrier, and is designed to complete the elevating movement of the controller just as the spindle carrier has completed its indexing movement.

The indexing mechanism operates as follows: When the controller 32 is lowered, the collar 33 swings the lever 34 and causes the engagement of clutch 31 connecting shaft 30 to the constant speed shaft 29. This immediately starts the rotation of the Geneva motion gear 44. As soon as the Geneva motion gear 44 starts its rotation, cam 44$^a$ engages the roller 40$^a$ on the inner end of the lever 40 and rocks the lever 40, disengaging the lock bolt 37 from the spindle carrier bushing 38 against the pressure of a spring 37$^b$, which spring surrounds the lock bolt rod 37$^a$ extending downwardly from the lock-bolt. The length of this cam is such that it rides out of engagement with the roller 40$^a$ so as to release the lever 40 and lock bolt and permit the latter to be restored by the spring 37$^a$ to locking position at the completion of the indexing movement of the spindle carrier.

As soon as the lock bolt 37 disengages the spindle carrier, the roller 45 on the lower face of the Geneva motion gear enters one of the slots 46$^a$ of the indexing gear 46 and turns the indexing gear through the fraction of a revolution to rotate the spindle carrier through a similar arc. During the indexing movement of the carrier the face cam 44$^c$ comes into play by engaging the roller 35$^a$ on bell crank 35, and swings said bell crank 35 so as to gradually elevate the controller, the controller being lifted and then automatically locked in elevated position at substantially the completion of the indexing movement of the spindle carrier. Just before the controller 32 starts its elevating movement under the action of the face cam 44$^c$, the circular or arc shaped cam 44$^b$ rides under a lug 47$^b$ on rod 47$^c$ adjustably secured to the lower end of rod 47 and prevents the lowering of the movable clutch member of the clutch 31, and thus prevents the disengagement of said clutch when the controller is elevated and the collar 33 is lifted out of engagement with the lever 34. The rod 47$^c$ is slidably mounted and splined in the bearing 16$^a$ as part of the frame 16, and said rod has a threaded engagement with rod 47 in order to allow adjustment.

It will be observed that the cam 44$^b$ is of considerable arcuate length, the length being such that it will prevent the disengagement of the clutch 31 until the Geneva motion gear has substantially completed its rotation, at which time the portion 44$^{bb}$ of cam 44$^b$ positively moves the rod 47 downward and disengages the clutch 31. That is to say, although following the starting of the indexing unit the lock bolt was withdrawn, the spindle carrier was indexed during which the controller was elevated and the lock bolt then restored to locking position, during which time the Geneva motion gear has rotated through a portion of its rotative movement, the clutch is not disengaged, and, in fact, is held by the cam 44$^b$ from being disengaged until the Geneva motion gear has substantially completed its rotation, so that it may be in position to properly function for the new or next succeeding cycle.

It is essential that the Geneva motion gear make precisely one complete rotation in order that all parts may be maintained in proper timed relationship, and therefore to carry the portion 44$^{bb}$ of cam 44$^b$ out of the path of lug 47$^b$ and to move the Geneva motion gear through the small remaining portion of the arc necessary to complete its rotation following the disengagement of clutch 31, I provide a spring point 48, shown by full lines in Fig. 1 and by dotted lines in Fig. 2, this spring point being supported by the base 15 in position such that when the movement of the Geneva motion gear is about to be stopped by the disengagement of the clutch 31, this spring point acts upon a spring point block 44$^d$ on the lower face of the Geneva motion gear and thus moves or continues to rotate the Geneva motion gear just far enough to complete its rotation.

Thus the indexing mechanism performs the several functions stated, and is maintained in operation until the Geneva motion gear is in just the proper position to again function for the next succeeding cycle of operations.

In Figs. 5, 6 and 7 I have shown a modified form of my invention as illustrated in my prior application Serial No. 437,436. Inasmuch as the construction of the two machines shown in Figs. 1 to 4 and in Figs. 5, 6 and 7, in so far as the parts illustrated are concerned, are very nearly the same, and as the material changes are in the indexing mechanism alone, I will confine the description to the parts directly involving the invention and will apply without detail description the reference characters which were utilized in describing the similar or corresponding parts in the construction first described.

Referring then to the indexing mechanism, it will be seen that I employ a Geneva motion gear 49 which is similar to the Geneva motion gear 44, and that this gear has on its lower face a roller 49$^a$ which rotates an indexing gear 50 having radial slots 50$^a$ which the roller is adapted to enter, this gear 50 being geared to the internal gear 41 of the spindle carrier 20 as in the first instance, this spindle carrier having the vertically disposed work spindles 21 operated in like manner to that described through the medium of the shaft 25 and gears 26, 27 and 28, the latter being carried by the work spindles.

this case as in the preceding case, the Geneva motion gear 49 is provided on its upper face with several cams. These include a cam 49$^a$ for lowering the lock bolt 37, this cam as in the prior instance being arranged adjacent the periphery of the Geneva motion gear and being adapted to be engaged by the roller 40$^a$ at the inner end of the lever 40. Inside the cam 49$^a$ there are two arc shaped cams 49$^b$ and 49$^c$. The innermost cam 49$^b$ corresponds to the cam 44$^b$ of Fig. 2, the function of this cam being to prevent the clutch 31 from being disengaged after the controller 32 is lifted, and being designed to ride under a lug 47$^b$ at the lower end of the rod 47$^d$ secured to the lower end of rod 47 which in this instance is pinned at 47$^c$ to the lever 34 which operates the clutch 31. This cam 49$^b$ as in the prior instance has at its end a portion 49$^{bb}$, the purpose of which is to positively move the rod 47 downward and thus disengage the clutch when the Geneva motion gear 49 has substantially completed one rotation. The clutch 31 in this machine is located in the uppermost portion of the machine 17$^a$ above the slide supporting part 17 of the center column 16, as will be seen by reference to my prior application, Serial No. 437,436. As is brought out in said application, the shaft 30 is designed to be rotated through clutch 31 by constant speed worm wheel 31$^a$ having clutch teeth cut on its lower face and being rotatably mounted on stationary shaft 31$^b$.

The cam corresponding to the face cam 44$^c$ of Fig. 2 and which functions to elevate the controller rod 32 is the middle arc shaped cam 49$^c$ of Fig. 6. In this instance the controller 32 has a bracket 51 mounted on its lower end, having an arm 51$^b$ carrying a roller 51$^a$ and said arm is slidably mounted in a slot 16$^b$ (see Fig. 6) of a supporting bracket 16$^a$ as part of the center column. The bracket 51 carrying the roller 51$^a$ is so positioned that the cam 49$^c$ will elevate it and thus lift the controller rod 32 while the indexing movement is being imparted to the spindle carrier 20. This arc shaped cam 49$^c$ has a tapered or pointed portion 49$^{cc}$ which elevates the controller 32 somewhat above its normal position for a purpose fully explained in my prior application, Serial No. 437,436, and then continues around the Geneva motion gear at a somewhat less elevation so as to serve as a means to positively prevent the controller being lowered until the Geneva motion gear has fully completed its rotation. In this respect the mechanism illustrated in Figs. 5, 6 and 7 has an additional function which the indexing mechanism first described does not possess. That is to say the use of the arc shaped cam 49$^c$ instead of the face cam 44$^c$ of Fig. 2 not only enables me to employ this cam 49$^c$ to restore the controller 32 to its normal upper position, but serves to prevent the lowering of the controller rod until the Geneva motion gear has been restored to a position such that it is ready for the next cycle of operations of the machine. In other words, with this mechanism it is impossible for the parts to get out of the proper timed relation with respect to one another.

In this instance as in the preceding construction, I provide a spring point for the purpose of completing the rotation of the Geneva motion gear after the clutch 31 has been disengaged. In this instance the spring point is designated 52 and is mounted above the Geneva motion gear 49, being held in a bracket 53 which is bolted to the center column of the machine. The lower bevel end of this spring point 52 is adapted to engage with the elevated beveled portion 49$^{cc}$ of the circular arc shaped cam 49$^c$ to move or continue the rotation of the Geneva motion gear 49 after the clutch 31 has been disengaged just far enough to exactly complete its rotation. At the same time it moves the portion 49$^{bb}$ of the circular or arc shaped cam 49$^b$ out of the path of lug 47$^b$ on rod 47$^d$ and permits the clutch to be engaged at the start of the next cycle of operations of the machine.

Thus it will be seen that with this construction as with the prior construction the indexing mechanism withdraws the lock bolt from locking engagement with the spindle carrier, then indexes the spindle carrier, and then causes the lock bolt to be restored, elevates the controller during the indexing movement, prevents the clutch controlling the indexing mechanism from being disengaged when the controller is elevated, or until just prior to the completion of the rotation of the Geneva motion gear, and additionally prevents the lowering of the controller during the remaining portion of the rotation of the Geneva motion gear.

The indexing mechanism of Figs. 8, 9, 10 and 11 constituting a part of the automatic multiple spindle chucking machine illustrated in application Serial No. 534,887, performs identical functions to those already described, but the indexing unit is arranged in a machine constructed somewhat differently than those already described. In this instance the work spindles and chucks at their outer ends and designated by the reference character 54 are arranged horizontally and radially near the top of the machine in the spindle carrier here designated 55 and rotatable on a circular way 56, adapted as in the prior instances to be locked by the lock bolt 37. The circular way 56 is provided near the top of the frame 57 which at its lower end rests upon and is bolted to a base 58. The frame has a circular column 59 which extends down to the base as shown.

In this instance the machine has a central vertical drive shaft 60 and surrounding this shaft there is a vertically movable controller in the form of a sleeve 61 which is connected by links 62 to a clutch lever 63 which operates a clutch 64 which as described fully in my application Serial No. 534,887 controls the spindle drives. When the controller sleeve is elevated, it is held in elevated position by a series of controller lock pins, one of which I have illustrated at 65 in Fig. 8, these lock pins being portions of the feeding units and being adapted to enter beneath a number of blocks 66 secured to the controller sleeve.

In this machine the vertical drive shaft 60 is provided at its lower end with a pinion 67 which through a series of idler gears 68 rotates an internal gear 69 having a bevel gear 70 which is engaged by a series of bevel gears 71 forming parts of the several feed units for the tool slides, and also a similar bevel gear 72 which rotates at a constant speed a horizontally disposed shaft 73 which is connected by worm 74 and a worm wheel 75 to a sleeve 76 designed to be clutched by an indexing clutch 77 to a vertical shaft 78 having at its upper end a pinion 79. This clutch 77 corresponds to the clutch 31 of the prior constructions inasmuch as it clutches the shaft instrumental in operating the indexing mechanism to a constant speed shaft, the shaft 78 and the pinion 79 being preferably formed in one integral part, the present construction eliminating the necessity for a long shaft such as the shaft 30 of the prior constructions.

The indexing clutch 77 is operated when the controller sleeve 61 is lowered, a lug 61$^a$ thereon swings downward a lever arm 80 to which is connected a second lever arm 81 which through a horizontally extending pin 82 actuates a bell-crank clutch lever 83 of the indexing clutch 77. This engages the clutch and causes the rotation of a pinion 79 which meshes with a Geneva motion gear 84 having a roller 85 on its upper face, which in the manner previously described rotates an indexing gear 86. Rotating with the indexing gear 86 is a gear 86$^a$ which drives a gear 87 on a vertical shaft 87$^a$, this shaft having at its upper end a gear 87$^b$ which engages the internal gear 88 secured to the spindle carrier, the mechanism for transmitting motion from the indexing gear to the spindle carrier being the same in principle and function as the similar mechanisms already described.

In this instance the Geneva motion gear 84 has on its lower face cams corresponding to those already described. These cams include an outer arc shaped cam 84$^a$ which is engaged by a roller 89 on a bracket 89$^a$ secured to the lower part of the lock bolt rod 87$^a$, the function of this cam 84$^a$ being as in the prior instance to disengage the lock bolt from the spindle carrier and to release the lock bolt so that it may be restored to locking position by the spring at the end of the indexing movement of the spindle carrier.

Inside the cam 84$^a$ there is a similar but longer arc shaped cam 84$^b$ which engages a roller 80$^a$ on the inner end of the lever 80 previously described, whose opposite end engages under the block 61$^a$ of the controller sleeve 61. This cam has an elevated tapered portion 84$^{bb}$ and when this portion of the cam engages the roller 80$^a$ it elevates the controller to a point slightly above its normal upper position for the purpose fully explained in my prior application Serial No. 534,887, the controller then being automatically locked in its normal position by a series of lock bolts 65 already referred to. Beyond the elevated part 84$^{bb}$ the cam continues at a uniform elevation, and all the time that this portion of the cam is engaged with the roller 80$^a$ the controller is prevented from being lowered, this part of the cam therefore performing the same function as the corresponding part of cam 49$^c$ of Fig. 6.

Inside the cam 84$^b$ is a third cam 84$^c$, the purpose of which is to prevent the indexing clutch 77 being disengaged when the controller sleeve is elevated. This cam 84$^c$ moves in the path of the upper end of an arm 83$^a$ which is integral with the bell-crank clutch lever 83, this taking place just as the controller sleeve is about to be elevated. By reference to Fig. 8 it will be observed that when this lever 83$^a$ is engaged by the cam 84$^c$ the clutch is prevented from being disengaged until the end of the cam is reached, and thus the clutch 77 is held engaged until the Geneva motion gear has substantially completed its rotation.

Inside the arc shaped cam 84$^c$ I provide a face cam 84$^d$ which is so positioned that when the Geneva motion gear has substantially completed its rotation it engages the upstanding lever 83$^a$ and shifts said lever outward and thus positively disengages the clutch 77, this face cam being clearly shown in Fig. 11.

Additionally I provide as in the preceding instances, a spring point 90 for the purpose of moving or causing the Geneva motion gear to continue to rotate until it has exactly made one complete rotation. This spring point which is shown in Figs. 8 and 10 gives the Geneva motion gear 84 the slight additional movement just explained by engaging with the elevated portion 84$^{bb}$ of the arc shaped cam 84$^b$, and after having moved the Geneva motion gear to complete its rotation it engages in a groove 84$^x$ in the cam 84$^b$ to hold the Geneva motion gear against accidental movement caused by vibration or the like.

Thus, as in the preceding cases, when the controller 61 is lowered, it causes the indexing clutch to be engaged, and immediately the indexing unit is started in operation. Immediately after the Geneva motion gear thus starts to rotate, the cam 84$^a$ disengages the lock bolt from the spindle carrier; then the roller 85 enters one of the radial slots 86$^b$ of the indexing gear 86 and the spindle carrier is indexed through the mechanism described, following which the cam 84$^a$ will release the lock bolt to reengage the spindle carrier as soon as it comes to rest. While the indexing movement is being given to the spindle carrier, the cam 84$^b$ elevates the controller and as already stated, prevents the controller being lowered prior to the completion of the functions of the indexing unit. Just before the controller is elevated, the cam 84$^c$ comes into action and prevents the indexing clutch 77 from being disengaged until the Geneva motion gear has substantially completed its rotation. Then the face cam 84$^d$ positively disengages the clutch 77, whereupon the spring point 90 comes into action and moves the Geneva motion gear through the further short distance necessary to complete its rotation and to move the face cam 84$^d$ out of the path of the lever 83$^a$, the spring point then acting as explained to hold the Geneva motion gear against movement, although it will not prevent the Geneva motion gear being rotated by the pinion 79 when the clutch 77 is next engaged.

In the foregoing description I have explained three slightly different embodiments of the invention, but other changes may be made, and I do not desire to be confined to the precise details or arrangements shown. Furthermore, while the indexing units shown and described were designed and are particularly adapted for use in automatic multiple spindle chucking machines disclosed in my prior application referred to, my invention may be used advantageously in other types of machine tools, and in the appended claims the expression "machine tools" is used in the broad sense as inclusive of other tools than the automatic multiple spindle chucking machines.

Having described my invention, I claim:

1. In a machine tool having a rotatable unit to be indexed, one or more tool slides and a controller movable in opposite directions independently of the tool slide or slides, an indexing mechanism, and means whereby the latter is caused to function by the movement of said controller in one direction.

2. In a machine tool having a rotatable unit to be indexed, one or more tool slides and a slidable controller movable independently of the tool slide or slides, an indexing mechanism, and means whereby the latter is caused to function by the movement of said controller in one direction.

3. In a machine tool having a rotatable unit to be indexed, one or more tool slides and a controller movable in opposite directions independently of the tool slide or slides, an indexing mechanism, a clutch controlling the indexing mechanism, and means whereby the controller by its movement in one direction causes the engagement of the clutch.

4. In a machine tool having a rotatable unit to be indexed, one or more tool slides and a slidable controller movable independently of the tool slide or slides, an indexing mechanism, a clutch controlling the indexing mechanism, and means whereby the controller by its movement in one direction causes the engagement of the clutch.

5. In a machine tool having a controller and a rotatable unit adapted to be indexed, an indexing mechanism, a clutch controlling the indexing mechanism, and means whereby the controller causes the engagement of the clutch, said indexing mechanism having means for preventing the disengagement of the clutch until after predetermined functions have been performed by the indexing mechanism.

6. In a machine tool having a slidable controller and a rotatable unit adapted to be indexed, an indexing mechanism, a clutch controlling the indexing mechanism, and means whereby the controller causes the engagement of the clutch, said indexing mechanism having means for preventing the disengagement of the clutch until after predetermined functions have been performed by the indexing mechanism.

7. In a machine tool having a controller and a rotatable unit adapted to be indexed, an indexing unit, means whereby the latter is caused to function by the movement of the controller in one direction, said indexing unit having means for causing the controller to be moved in the reverse direction.

8. In a machine tool having a slidable controller and a rotatable unit adapted to be indexed, an indexing unit, means whereby the latter is caused to function by the movement of the controller in one direction, and means whereby the indexing unit causes the controller to be moved in the reverse direction.

9. In a machine tool having a controller and a rotatable unit adapted to be indexed, a lock bolt for preventing rotation of said unit, an indexing mechanism, means whereby said indexing mechanism is caused to function by movement of the controller, said indexing mechanism having means for disengaging the lock bolt and for rotating the rotatable unit.

10. In a machine tool having a controller and a rotatable unit adapted to be indexed, a lock bolt for preventing rotation of said unit, an indexing mechanism, means whereby said indexing mechanism is caused to function by movement of the controller, said indexing mechanism having means for rotating the rotatable unit, and having a circular cam for disengaging the lock bolt.

11. In a machine tool having a controller and a rotatable unit adapted to be indexed, a lock bolt for preventing rotation of said unit, an indexing mechanism, means whereby the indexing mechanism is caused to function by movement of the controller, said indexing mechanism having means comprising a Geneva motion gear for rotating the rotatable unit, and a cam on said gear for controlling the lock bolt.

12. In a machine tool having a rotatable unit adapted to be indexed, an indexing unit, a clutch by which the latter is connected to a power shaft of the machine, a controller for causing the engagement of said clutch, said indexing unit having means for preventing the disengagement of the clutch until predetermined functions have been performed thereby.

13. In a machine tool having a rotatable unit adapted to be indexed, an indexing unit, a clutch by which the latter is connected to a power shaft of the machine, a controller for causing the engagement of said clutch, said indexing unit having a cam for preventing the disengagement of the clutch until predetermined functions have been performed thereby.

14. In a machine tool having a rotatable unit adapted to be indexed, an indexing unit, a clutch by which the latter is connected to a power shaft of the machine, a controller for causing the engagement of said clutch, said unit having a Geneva motion gear and a cam on said gear for preventing the disengagement of the clutch until predetermined functions have been performed thereby.

15. In a machine tool having a controller and a rotatable unit adapted to be indexed, an indexing unit, means whereby the latter is caused to function by the movement of the controller in one direction, said indexing unit having means for moving the controller in the opposite direction and for preventing movement of the controller in the first named direction until the indexing mechanism has completed all its functions.

16. In a machine tool having a rotatable unit adapted to be indexed, an indexing mechanism for rotating said unit, a clutch for controlling the operation of said indexing mechanism, said indexing mechanism comprising a rotatable member having means for controlling the disengagement of the clutch, and means for causing said member to move a sufficient amount after the disengagement of the clutch so as to cause it to make one complete rotation each time the indexing mechanism is caused to function.

17. In a machine tool having a rotatable unit adapted to be indexed, an indexing mechanism for rotating said unit, a clutch for controlling the operation of said indexing mechanism, said indexing mechanism comprising a rotatable member, and a spring point co-operating with said rotatable member for insuring one complete rotation thereof each time the indexing mechanism is caused to function.

18. In a machine tool having a rotatable unit to be indexed, an indexing mechanism for indexing said unit, a clutch adapted to be engaged to cause the operation of the indexing mechanism, a lock bolt for engaging the rotatable unit to prevent rotation thereof, said indexing mechanism comprising a rotatable member having cams for controlling the lock bolt and for controlling the clutch.

19. In a machine tool having a rotatable unit to be indexed, an indexing mechanism for indexing said unit, a clutch adapted to be engaged to cause the operaton of the indexing mechanism, a lock bolt for engaging the rotatable unit to prevent rotation thereof, said indexing mechanisn comprising a Geneva motion gear having cams for controlling the lock bolt and for controlling the clutch.

20. In a machine tool, a rotatable unit adapted to be indexed, an indexing mechanism therefor, a lock bolt for engaging said rotatable unit to prevent rotation thereof, a clutch adapted to be engaged to cause the operation of the indexing mechanism, a controller for controlling the engagement of the clutch, said indexing mechanism comprising rotatable means having cams for controlling the lock bolt, for controlling the disengagement of the clutch and for shifting the controller to normal position.

21. In a machine tool having a rotatable unit adapted to be indexed, an indexing mechanism for rotating said unit, a lock bolt adapted to engage said unit to prevent rotation thereof, a clutch adapted to be engaged to cause the operation of the indexing mechanism, a controller movable in one direction to cause the engagement of said clutch, said indexing mechanism comprising a Geneva motion gear having cams for controlling the lock bolt, for controlling the disengagement of said clutch and for restoring the controller to normal position.

22. In a machine tool having a rotatable unit adapted to be indexed, indexing mechanism for rotating said unit, a lock bolt adapted to engage said unit to prevent rotation thereof, a clutch adapted to be engaged to cause the operation of the indexing mechanism, a controller movable in one direction to cause the engagement of said clutch, said indexing mechanism comprising a Geneva motion gear having cams for controlling the lock bolt, for controlling the disengagement of said clutch and for restoring the controller to normal position, and means co-operating with a part of said Geneva motion gear to insure one complete rotation thereof each time the indexing mechanism is caused to function.

In testimony whereof, I hereunto affix my signature,

JOHN J. N. VAN HAMERSVELD.